United States Patent [19]

Urino

[11] Patent Number: 5,029,988
[45] Date of Patent: Jul. 9, 1991

[54] BIREFRINGENCE DIFFRACTION GRATING TYPE POLARIZER

[75] Inventor: Yutaka Urino, Tokyo, Japan

[73] Assignee: NEC Corporation, Tokyo, Japan

[21] Appl. No.: 372,739

[22] Filed: Jun. 28, 1989

[30] Foreign Application Priority Data

Jun. 29, 1988 [JP] Japan ................................. 63-164048

[51] Int. Cl.[5] .............................................. G02B 6/12
[52] U.S. Cl. ................................ 350/347 R; 350/96.19; 350/162.17
[58] Field of Search .................... 350/337, 347 R, 392, 350/400, 401, 406, 330, 447 E, 162.2, 162.17, 162.15, 162.21, 162.22, 162.23, 162.24, 96.19, 96.31

[56] References Cited

U.S. PATENT DOCUMENTS

4,707,059  11/1987  Ogura et al. ........................ 350/96.19

FOREIGN PATENT DOCUMENTS

| 60-188911 | 9/1985 | Japan | 350/96.19 |
| 63-43101 | 2/1988 | Japan | 350/162.17 |
| 54314502 | 12/1988 | Japan | 350/162.17 |
| 1-107206 | 4/1989 | Japan | 350/162.17 |

OTHER PUBLICATIONS

"10 GHZ Bandwidth Traveling-Wave LiNbO$_3$ Optical Waveguide Modulator"—Izutsu et al.—IEEE Journal of Quantum Electronics, vol. QE-14, No. 6, Jun. 1978, pp. 394-395.
"Efficient Prism-Couping into Titanium Diffused Lithium Niobate Optical Waveguides"—Sohler et al.—Wave Electronics-3 (1979), 269-275, Apr.-1979.

Primary Examiner—Rolf Hille
Assistant Examiner—S. V. Clark
Attorney, Agent, or Firm—Sughrue, Mion, Zinn, Macpeak & Seas

[57] ABSTRACT

A birefringence diffraction grating type polarizer is composed of an optically anisotropic sheet crystal substrate. The optically anisotropic sheet crystal substrate is provided with periodical ion-exchanged regions on the main plane thereof, thereby providing an optical diffraction grating. The ion-exchanged regions are covered with dielectric layers, respectively, and further diffused in the vicinity of the surface thereof with metal. Utilizing this structure, it a linearly polarized incident light does not become an elliptically polarized light.

6 Claims, 1 Drawing Sheet

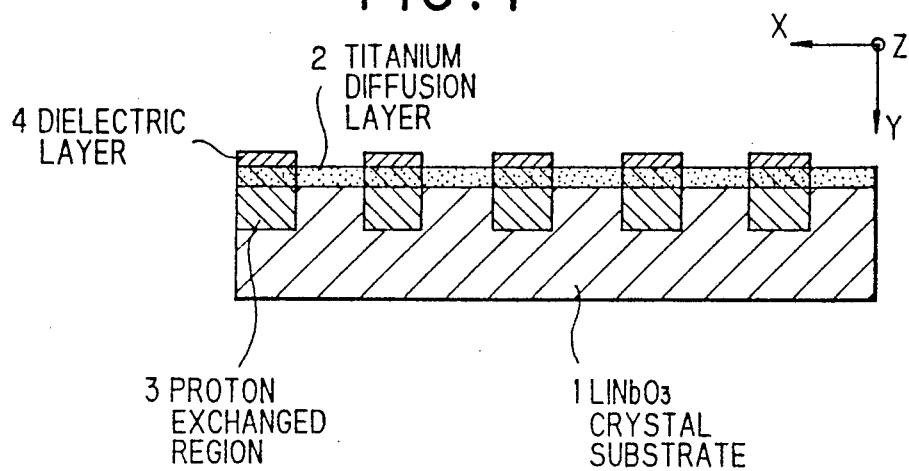
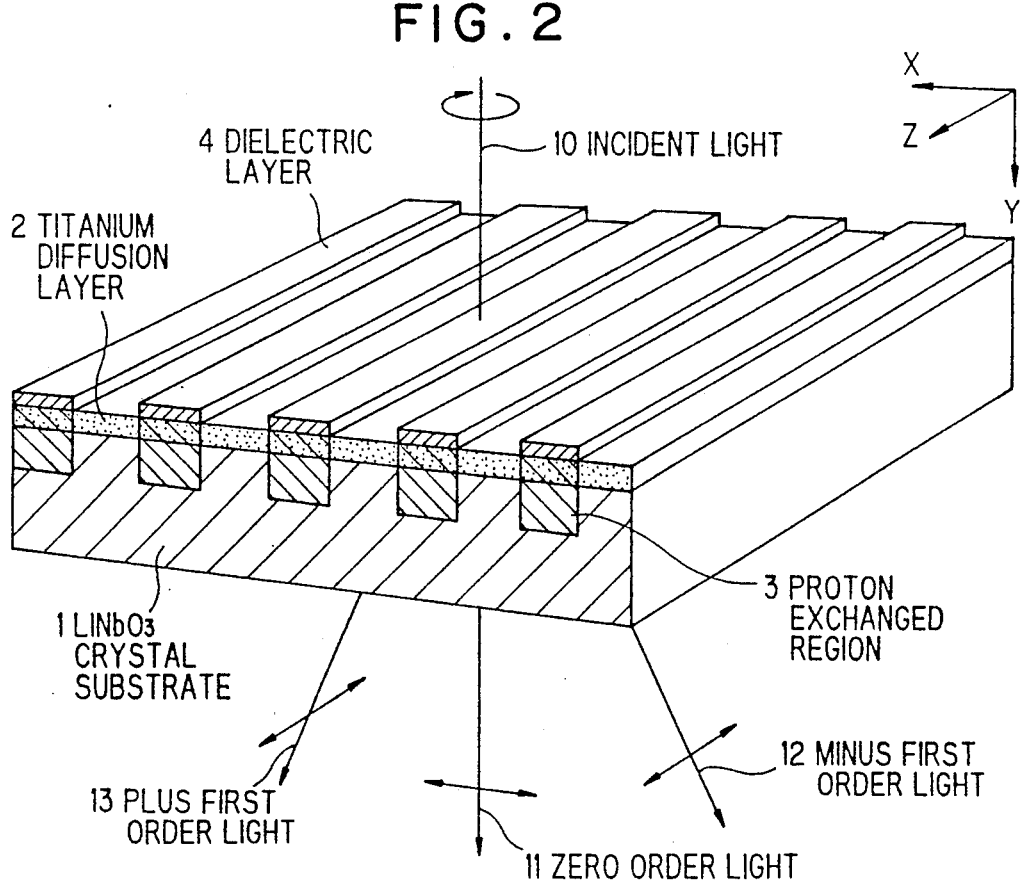

ND DIFFRACTION GRATING
BIREFRINGENCE DIFFRACTION GRATING TYPE POLARIZER

FIELD OF THE INVENTION

This invention relates to a birefringence polarizer, and more particularly to a grating type polarizer based on different diffraction efficiencies depending on the direction of polarization.

BACKGROUND OF THE INVENTION

A polarizer element, particularly a polarizing beam splitter, is an element in which a specific polarized light is obtained at different angles of propagation which depend on the direction of polarization of two orthogonally polarized components of an incident light.

Conventional polarizing beam splitters, such as the Glan-Thompson prism or Rochon prism, include an element using a crystal with enhanced birefringence in which a light path is split due to the difference between refraction angles or total reflection angles of two orthogonally polarized components of light at the reflection plane of the crystal. In addition, the conventional polarizing beam splitter includes an element using a total reflection prism which consists of an isotropic optical medium such as glass and provided with a multi-layer dielectric film formed on the reflection plane thereof whereby light is totally reflected, or otherwise transmitted, in accordance with refractive indices of polarized components.

These conventional elements, however, have a disadvantage that they are large in size, low in production efficiency and expensive.

The reflection boundary surface in these conventional elements is slanted by at least 45 degrees relative to the light axis. Therefore, such an element has to take the form of a cube having a side no less than $\sqrt{2}$ times a diameter of the light beam to be transmitted. Specifically, the side of the cube is as long as 8 to 10 mm where the conventional polarizer element is applied to an optical disc recording or reproducing apparatus.

Another type of a conventional polarizer element is disclosed in "National conference record, 1982, Optical & Radio Wave Electronics, the Institute of Electronics & Communication Engineers of Japan, Part 2". The conventional polarizer element consists of a birefringent tapered plate of Rutile ($TiO_2$) having a tapered angle of 4 degrees. When parallel light beam is incident to the birefringent tapered plate on one side thereof, the parallel light beam is subject to different refractions between an extraordinary ray component and an ordinary ray component, so that the two components are split on the other side of the birefringent tapered plate with a split angle of approximately 1 degree.

The birefringent tapered plate, however, is associated with a disadvantage that a fabricating process is complicated, because the cutting of a tapered configuration is difficult on a mass-production basis, and the polishing of a tapered surfaces is also difficult to be carried out. There is a further disadvantage that Rutile is expensive.

SUMMARY OF THE INVENTION

Accordingly, it is an object of the invention to provide a birefringence diffraction grating type polarizer, the size of which is small.

It is a further object of the invention to provide a birefringence diffraction grating type polarizer which is of a low material cost.

It is a still further object of the invention to provide a birefringence diffraction grating type polarizer which is fabricated by a simple process.

It is a yet still further object of the invention to provide a birefringence diffraction grating type polarizer in which it is avoided that a linearly polarized light becomes an elliptically polarized light, thereby providing a high extinction ratio.

According to the invention, a birefringence diffraction grating type polarizer comprises, an optically anisotropic sheet crystal substrate provided with periodical ion-exchanged regions on the principal plane thereof to form an optical diffraction grating, dielectric layers each provided on each of the ion-exchanged regions, and a metal diffusion layer in which metal is diffused in the vicinity of the surface of the crystal substrate at least within the regions where the ion-exchange is effected on the crystal substrate.

BRIEF DESCRIPTION OF THE DRAWINGS

The invention will be explained in more detail in conjunction with appended drawings wherein, FIG. 1 is a cross-sectional view showing a birefringence diffraction grating type polarizer in an embodiment according to the invention, and FIG. 2 is a perspective view of the polarizer of FIG. 1.

DESCRIPTION OF THE PREFERRED EMBODIMENTS

Before explaining a birefringence polarizer in an embodiment according to the invention, the principle and the feature of the invention will be briefly explained.

A birefringence diffraction grating type polarizer according to the invention is composed of an optically anisotropic crystal substrate which is provided, on the principal plane parallel to its optical axis, with a series of ion-exchanged regions, each of which is provided with a dielectric layer deposited thereon, whereby a light path is split due to the difference in diffraction efficiencies.

The refractive index within ion-exchanged regions provided periodically on the principal plane of, for example, a lithium niobate crystal substrate, is changed due to the ion-exchange as much as $+0.10$ for the ordinary ray and $-0.04$ for the extraordinary ray at the wavelength of 1.3 μm. Therefore, if the decrease in the refractive index for the ordinary ray within the ion-exchanged region is compensated by increasing the thickness of the dielectric layer on the ion-exchanged region, both the diffraction efficiency of first or higher order for the ordinary ray and the zero order diffraction efficiency for the extraordinary ray can be made null, so that a polarizer is formed.

It is found, however, that distortion of the crystal lattice is sometimes caused by the ion-exchange on the substrate. As a result, linearly polarized incident light becomes elliptically polarized light, thereby resulting in degradation of the extinction ratio. For this reason, a high extinction ratio is not obtained, even if polarizers of this type are arranged in tandem, or where an optical isolator is composed in the combination of the polarizer with a Faraday rotor.

The polarizer according to the invention is prevented from the distortion of the crystal lattice caused by the ion-exchange by means of a metal diffused layer near the surface of the crystal, consequently, it is avoided that a linearly polarized incident light becomes an elliptical polarized light. That is, the crystal lattice is subject to distortion in an opposite direction to that in the ion-exchange by the diffusion of metal thereinto, where an orientation of the crystal substrate and a kind of the metal are appropriately selected. Accordingly, the distortion of the crystal lattice caused by the metal diffusion and that of the crystal lattice caused by the ion-exchange cancel each other to avoid the distortion of the crystal lattice. Therefore, a birefringence diffraction grating type polarizer having a high extinction ratio and a minimized insertion loss is obtained.

A birefringence diffraction grating type polarizer in an embodiment according to the invention will be explained referring to FIGS. 1 and 2. A crystal substrate 1 having optical anisotropy is, in this embodiment, a Y cut crystal sheet of lithium niobate (LiNbO3). A series of proton-exchanged regions 3 are provided periodically on the substrate 1. Each of these proton-exchanged regions 3 is provided with a dielectric film 4 of a required thickness deposited thereon to form an optical diffraction grating. A metal diffusion layer 2 is formed covering the upper surface of the substrate 1.

As shown in FIG. 2, an incident light 10 of circular polarization is split to a zero order diffraction light 11 polarized in the x-axis, a plus first order diffraction light 12 and a minus first order diffraction light 13, such that the latter two lights are polarized orthogonally to the polarization of the zero order light 11.

The intensity of the zero order diffraction light from the diffraction grating as shown in FIG. 1 and FIG. 2 is given by the equation $$\cos^2\{\pi[\Delta n T_p + (n_d-1)T_d]/\lambda\}$$

where $\lambda$ represents a wavelength of light, $\Delta n$ represents the change in the refractive index by the protonexchange, $T_p$ represents a depth of the proton-exchanged regions 3, $n_d$ represents a refraction index of the dielectric film 4. If a wavelength of light is 1.3 $\mu$m, the change in the refractive index due to the protonexchange is about $+0.10$ for the ordinary ray and about $-0.04$ for the extraordinary ray.

If a film of niobium oxide ($Nb_2O_5$) having a refractive index of approximately 2.2 is used for the dielectric film 4, the proton-exchanged region 3 of about 4.6 $\mu$m in depth and the niobium oxide film of 160 nm in thickness cause the zero-order diffraction intensity for the extraordinary ray to be zero and the zero-order diffraction intensity for the ordinary ray to be 1, so that the element functions as a polarizer.

The polarizer according to the invention is fabricated by (1) depositing a metal film on a crystal substrate 1 having an optical anisotropy such as lithium niobate etc. by means of sputtering, electron beam evaporation or the like, (2) providing a metal diffusion layer 2 having the approximately same depth as that of proton-exchanged regions 3 by heating in an electric furnace, and where the metal is titanium, diffusing titanium thermally by heating the substrate at about 1000° C. or higher for several hours, for example at 1050° C. for 8 hours, to form titanium diffusion layer 2 in accordance with a deposited titanium film of a 300 Å thickness, (3) forming a mask in the form of a grating over the substrate 1 by a conventional lithographic technology or the like, (4) immersing the crystal substrate with the mask in an acid at the temperature of 200° C. or higher for several hours, for example, in benzoic acid at 249° C. for four and half hours, to form proton-exchanged regions 3, and (5) forming a dielectric film 4 on each of the proton-exchanged regions 3.

In forming the dielectric film 4, a sputtering process in which niobium oxide ($Nb_2O_5$) is used for a target, or a reactive sputtering process in which Nb is used for a target in an atmosphere of $O_2$ is carried out to provide a grown film, and an ordinary lithographic technology is utilized to provide a predetermined pattern, where niobium oxide ($Nb_2O_5$) is used for the dielectric film 4. If required, an anti-reflection film is provided on both the dielectric film 4 and a region in which the dielectric film 4 is not provided. The anti-reflection film is provided in the form of an $SiO_2$ film having a thickness of approximately 2200 Å and a refractive index of approximately 1.5 by an ordinary sputtering process, where the anti-reflection film faces, for instance, the air.

In a polarizer according to the invention, a diffraction angle is inversely proportional to a pitch of a diffraction grating. Therefore, the pitch is determined, such that the diffraction angle is more than a predetermined separation angle. For instance, a first order diffraction angle is 0.74°, where the pitch is 100 $\mu$m at a light wavelength of 1.3 $\mu$m, and the first order diffraction angle is 7.5°, where the pitch is 10 $\mu$m at the same wavelength.

Where a Y plate of lithium niobate is diffused with titanium, crystal lattice is subject to distortion in an opposite direction to that in the ion-exchange as described before. Therefore, the distortion of the crystal lattice caused by a metal diffusion and that of the crystal lattice caused by the ion-exchange cancel each other, thereby eliminating the distortion of the crystal lattice. Accordingly, either an ordinary or extraordinary ray split in a polarizer according to the invention is does not become elliptically polarized. This provides a polarizer having a very high extinction ratio, where polarizers of the invention are in a tandem arrangement, and an isolator having a high extinction ratio, where the isolator is provided in the combination of the polarizer with a Faraday rotor.

The diffusion of metal such as titanium may be restricted to proton-exchanged regions, though titanium is diffused on the whole surface of the substrate in the described embodiment. Copper, nickel, vanadium, magnesium or the like may be used in place of titanium in the metal diffusion layer 2.

According to the invention, a polarizer in a thin form can be obtained at a low cost, since it can be fabricated from a thin lithium niobate sheet crystal in quantities by batch process, and the polarizer provides a high extinction ratio and a low insertion loss.

Although the invention has been described with respect to specific embodiment for complete and clear disclosure, the appended claims are not to thus limited but are to be construed as embodying all modification and alternative constructions that may occur to one skilled in the art which fairly fall within the basic teaching herein set forth.

What is claimed is:

1. A birefringence diffraction grating type polarizer, comprising:

an optically anisotropic sheet crystal substrate provided with periodic ion-exchanged regions on the main plane thereof to form an optical diffraction grating;

dielectric layers provided on each of said ion-exchanged regions, wherein the depth of said ion-exchanged regions and the thickness of said dielectric layer are selected so as to cause the zero order diffraction intensity for the extraordinary ray to be substantially zero and the zero order intensity for the ordinary ray to be substantially 1; and a metal diffusion layer in which metal is diffused in the vicinity of the surface of said crystal substrate at least within regions where ion-exchange is effected on said crystal substrate.

2. A birefringence diffraction grating type polarizer as defined in claim 1, wherein said metal diffusion layer is provided on the whole surface of said crystal substrate.

3. A birefringence diffraction grating type polarizer as defined in claim 1, wherein said crystal substrate is composed of lithium niobate.

4. A birefringence diffraction grating type polarizer as defined in claim 1, wherein said metal is selected from the group consisting of titanium, copper, nickel and vanadium.

5. A birefringence diffraction grating type polarizer as defined in claim 1. wherein said dielectric layer is composed of quartz.

6. A birefringence diffraction grating type polarizer as defined in claim 1, wherein said ion-exchanged region is a proton-exchanged region.

* * * * *

UNITED STATES PATENT AND TRADEMARK OFFICE
CERTIFICATE OF CORRECTION

PATENT NO.  :  5,029,988

DATED       :  July 9, 1991

INVENTOR(S) :  Yutaka Urino

It is certified that error appears in the above-identified patent and that said Letters Patent is hereby corrected as shown below:

In the Abstract, line 9, delete "it";

Col. 3, line 44, after "film 4" insert --, and $T_d$ represents a thickness of the dielectric film 4--.

Signed and Sealed this

Ninth Day of March, 1993

*Attest:*

STEPHEN G. KUNIN

*Attesting Officer*     *Acting Commissioner of Patents and Trademarks*